(12) United States Patent
Lamb et al.

(10) Patent No.: US 10,764,675 B2
(45) Date of Patent: Sep. 1, 2020

(54) WEARABLE MICROPHONE HOUSING WITH BUILT-IN REDUNDANCY

(71) Applicant: Point Source Audio, Inc., Petaluma, CA (US)

(72) Inventors: James Lamb, Novato, CA (US); Yvonne Ho, Novato, CA (US)

(73) Assignee: Point Source Audio, Inc., Petaluma, CA (US)

( * ) Notice: Subject to any disclaimer, the term of this patent is extended or adjusted under 35 U.S.C. 154(b) by 0 days.

(21) Appl. No.: 15/727,576

(22) Filed: Oct. 7, 2017

(65) Prior Publication Data

US 2019/0110124 A1 Apr. 11, 2019

(51) Int. Cl.
| | |
|---|---|
| *H04R 1/02* | (2006.01) |
| *H04R 1/08* | (2006.01) |
| *H04R 9/08* | (2006.01) |
| *H04R 1/14* | (2006.01) |
| *H04B 1/3827* | (2015.01) |
| *H04R 1/06* | (2006.01) |
| *H04R 3/00* | (2006.01) |
| *H04R 1/40* | (2006.01) |

(52) U.S. Cl.
CPC ............... *H04R 1/14* (2013.01); *H04B 1/385* (2013.01); *H04B 2001/3866* (2013.01); *H04R 1/025* (2013.01); *H04R 1/06* (2013.01); *H04R 1/406* (2013.01); *H04R 3/005* (2013.01)

(58) Field of Classification Search
CPC .......... H04R 25/60; H04R 25/65; H04R 1/08; H04R 9/08; H04R 11/04; H04R 17/02; H04R 21/02

USPC ................................ 381/322, 355–358, 364
See application file for complete search history.

(56) References Cited

U.S. PATENT DOCUMENTS

| | | |
|---|---|---|
| 800,055 A | 9/1905 | Ayres |
| 1,085,916 A | 2/1914 | Hutchinson |
| 1,587,643 A | 6/1926 | Nathaniel |
| D74,984 S | 4/1928 | Myers |
| 2,337,953 A | 12/1943 | Wirsching |
| 2,477,046 A * | 7/1949 | Davenport ............. H04R 25/65 381/313 |
| 2,513,746 A | 7/1950 | Rohr |
| 2,566,313 A | 9/1951 | Cates |
| 2,954,442 A | 9/1960 | Mickenberg |
| D196,515 S | 10/1963 | Flystad |
| 3,691,319 A | 9/1972 | Bee |
| D238,178 S | 12/1975 | Kinnan |
| 4,020,297 A | 4/1977 | Brodie |
| 4,090,042 A | 5/1978 | Larkin |
| D252,024 S | 6/1979 | Fujita |
| 4,257,666 A | 3/1981 | Schauer |
| 4,273,969 A | 6/1981 | Foley |
| 4,289,938 A | 9/1981 | Zichy |

(Continued)

*Primary Examiner* — Suhan Ni

(57) ABSTRACT

A wearable audio apparatus used to support multiple audio components, namely, microphones. The audio apparatus can have a housing that contains the multiple microphones. The housing can be easily worn by a user, such as by coupling to a headset, ear mount/hook, user's clothing, or user's body. The microphones can be acoustically matched for rapid swapping without requiring a separate audio setup. The audio components can be mounted astride or near one another in the audio apparatus. The audio components can also be separately wired so that each audio component can be independently activated.

30 Claims, 9 Drawing Sheets

(56) References Cited

U.S. PATENT DOCUMENTS

| | | | |
|---|---|---|---|
| D274,839 S | 7/1984 | Libby | |
| D280,323 S | 8/1985 | Scheid | |
| D281,420 S | 11/1985 | Rosental | |
| 4,617,431 A | 10/1986 | Scott | |
| D295,169 S | 4/1988 | Cho | |
| 4,911,510 A | 3/1990 | Jenkins | |
| D309,305 S | 7/1990 | von Hall | |
| D326,268 S | 5/1992 | Le Tixerant | |
| 5,210,792 A | 5/1993 | Kajihara | |
| 5,336,849 A | 8/1994 | Whitney | |
| D356,571 S | 3/1995 | Garmon | |
| D362,008 S | 9/1995 | McCumber | |
| 5,729,615 A | 3/1998 | Yang | |
| D394,669 S | 5/1998 | Becker | |
| 5,761,298 A | 6/1998 | Davis | |
| 5,793,878 A | 8/1998 | Chang | |
| 5,828,757 A * | 10/1998 | Michalsen | H04R 25/502 381/328 |
| D418,512 S | 1/2000 | Lin | |
| D421,755 S | 3/2000 | Pitel | |
| 6,097,827 A | 8/2000 | Yang | |
| 6,101,258 A * | 8/2000 | Killion | H04R 25/407 381/313 |
| D449,038 S | 1/2001 | Andreini | |
| D441,739 S | 5/2001 | Hayes | |
| 6,233,344 B1 | 5/2001 | Clegg | |
| 6,396,935 B1 | 5/2002 | Makkonen | |
| D463,399 S | 9/2002 | Konomi | |
| 6,456,721 B1 | 9/2002 | Fukuda | |
| 6,584,984 B2 | 7/2003 | Kelly | |
| D478,579 S | 8/2003 | Sade | |
| 6,603,863 B1 | 8/2003 | Nagayoshi | |
| D479,226 S | 9/2003 | Beauregard | |
| 6,616,487 B1 | 9/2003 | Lai | |
| D484,875 S | 1/2004 | Higgins | |
| D498,251 S | 11/2004 | Invencio | |
| D518,816 S | 4/2006 | Naito | |
| D519,990 S | 5/2006 | Lazor | |
| 7,052,281 B1 | 5/2006 | Meyberg | |
| 7,231,056 B2 | 6/2007 | Chen | |
| D553,567 S | 10/2007 | Kawanobe | |
| D563,395 S | 3/2008 | Pitcher | |
| D566,104 S | 4/2008 | Suzuki | |
| D573,101 S | 7/2008 | Ng | |
| D575,772 S | 8/2008 | Schultz | |
| D582,902 S | 12/2008 | Crous | |
| 7,473,098 B1 | 1/2009 | Poulos | |
| D585,881 S | 2/2009 | Nam | |
| 7,520,763 B1 | 4/2009 | Buse | |
| D593,075 S | 5/2009 | Williams | |
| 7,613,292 B2 | 11/2009 | te Riet | |
| 7,648,005 B2 | 1/2010 | Leong | |
| D611,933 S | 3/2010 | Burnham | |
| 8,009,853 B2 | 8/2011 | Ito et al. | |
| D645,028 S | 9/2011 | Pescetto | |
| 8,107,664 B2 | 1/2012 | Mao | |
| D693,773 S | 11/2013 | Chen | |
| D713,385 S | 9/2014 | Burgett | |
| D720,726 S | 1/2015 | Yu | |
| 8,985,538 B2 | 3/2015 | Rapoport | |
| D733,658 S | 7/2015 | Yang | |
| 9,271,065 B2 | 2/2016 | Lamb | |
| D778,877 S | 2/2017 | Lin | |
| 9,706,285 B2 | 7/2017 | Lamb | |
| D815,599 S | 4/2018 | Kobayashi | |
| D815,600 S | 4/2018 | Matsuoka | |
| 9,942,641 B2 | 4/2018 | Lamb | |
| D825,468 S | 8/2018 | Zeng | |
| 2002/0166691 A1 | 11/2002 | Yaworski | |
| 2006/0073728 A1 | 4/2006 | Zaiken | |
| 2006/0211293 A1 | 9/2006 | Li | |
| 2008/0247590 A1 | 10/2008 | Sun | |
| 2009/0285434 A1 | 11/2009 | Williams | |
| 2010/0061581 A1 | 3/2010 | Soetejo | |
| 2012/0076342 A1 | 3/2012 | Weber | |
| 2012/0149229 A1 | 6/2012 | Kearsley | |
| 2013/0075149 A1 | 3/2013 | Golka | |
| 2014/0161295 A1 * | 6/2014 | Huang | H04R 1/406 381/357 |
| 2018/0317002 A1 * | 11/2018 | Bernal Castillo | H04R 1/326 |

\* cited by examiner

WEARABLE MICROPHONE HOUSING WITH BUILT-IN REDUNDANCY

BACKGROUND

Personal headsets for audio systems have been in use for many years, and for a variety of different applications. Users that typically desire quality audio headsets can include, for example, musical or theater artists, broadcasters, public speakers, telephone operators, dispatchers, airplane pilots, video camera operators, studio mixers, and professional sound technicians, among other various others. In many such occupations and applications, it may be desirable for such audio headsets to have speakers (e.g., earphones) and/or microphones. In the case of theater or musical productions, it is desirable that headset being worn by an artist not be noticeable to viewers, which can be members in an audience or viewers of a digital recording thereof.

Besides headsets, audio systems can also use wearable mountings (e.g., ear mounts or ear hooks) separate audio components, such as speakers or microphones. In one application, a microphone, as a separate component, is configured to be attached to a user (e.g., artist). The microphone is typically connected by wires to a wireless transmitter (sometimes referred to as a body-pack) that is also attached to the user. One type of microphone that is typically worn by a user is known as a lavalier microphone (or lavalier), which is a small microphone used for television, theatre, and public speaking applications in order to allow for hands-free operation.

Typically, a professional using a microphone with an audio headset, wearable mounting, or individual component would have a single microphone. A sound technician would check audio pickup from the microphone before the user starts her activity (e.g., show, shift, event, etc.). The microphone can be secured to a headset or ear mount/hook, or even to the user's body or clothing. The microphone might be integral with the headset, or attached to an ear mount/hook or to the user's body or clothing. A microphone can be attached to a user's body or clothing, such as with adhesive tape or cable binding sleeves (e.g., Hellerman sleeves). Regardless, audio setup is an important process and requires a period of time. Sometimes high end users, e.g., professionals, also configure another separate microphone which can be independently secured to a headset or ear mount/hook, or even to the user's body or clothing. The professional then wears two audio setups, which can be cumbersome or visually unappealing. Alternatively, the professional can wear only one audio setup and have the second one readily available for use should there be a problem with the first audio setup.

While such microphones, regardless of whether used as a separate component or not, normally yield high performance, sometimes there is a performance problem with the microphone or its wireless transmitter. When such a performance problem occurs during a live event of the artist or broadcaster, the problem is serious and must be resolved quickly.

Hence, there is a need for improved designs in which audio components are able to be efficiently provided and rendered easily swappable.

SUMMARY

The invention pertains to a wearable audio apparatus that is used to support multiple audio components. The audio apparatus can be worn separately or via another apparatus. The audio apparatus can have a housing that contains the multiple audio components. The housing can be easily worn by a user, such as by coupling to a headset, ear mount/hook, user's clothing, or user's body. The audio components can be acoustically matched for redundancy and rapid swapping without requiring a separate audio setup. The audio components can be mounted astride or near one another in the audio apparatus. The audio components can also be separately wired so that each audio component can be independently activated. The housing can also be colored or camouflaged to match the user's skin or clothing.

Embodiments of the invention can be implemented in numerous ways, including as a device, apparatus, system or method. Several embodiments of the invention are discussed below.

As a wearable audio apparatus, one embodiment can, for example, include at least: a housing having an internal cavity; a first microphone positioned and secured within the internal cavity, the first microphone having a first audio responsiveness; a second microphone positioned and secured within the internal cavity, the second microphone having a second audio responsiveness; and a cover provided on a top portion of the housing, the cover having first and second apertures therein, the first aperture being aligned over the first microphone and the second aperture being aligned over the second microphone.

As an audio apparatus, one embodiment can, for example, include at least: a cable having a plurality of wires; a housing having a top region, a middle region and a bottom region, the top region having an opening, the middle region having an internal cavity, the bottom region having an opening for receiving the cable; a first microphone positioned and secured within the internal cavity, the first microphone having a first audio responsiveness; a second microphone positioned and secured within the internal cavity, the second microphone having a second audio responsiveness; an internal support structure provided internal to the housing at the bottom region, the internal support structure being configured to at least secure the cable to the bottom region and/or middle region of the housing; and a cover provided on a top portion of the housing, the cover having first and second apertures therein, the first aperture being over the first microphone and the second aperture being over the second microphone.

As a method for assembling a lavalier microphone assembly, one embodiment can, for example, include at least: providing a wearable housing have a cavity; identifying a pair of matching audio components; positioning and securing the pair of matching audio components within the wearable housing; receiving and securing a cable to the wearable housing, the cable including a plurality of wires; and electrically connecting one or more different ones of the wires within the cable to different ones of the audio components of the pair of matching audio components.

Other aspects and advantages of embodiments of the invention will become apparent from the following detailed description taken in conjunction with the accompanying drawings which illustrate, by way of example, the principles of the invention.

BRIEF DESCRIPTION OF THE DRAWINGS

The accompanying drawings illustrate one or more exemplary embodiments and, together with the description of exemplary embodiments, serve to explain principles and implementations. The drawings are for illustration purposes and are not necessarily drawn to scale. The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention pertains to a wearable audio apparatus that is used to support multiple audio components. The audio apparatus can be worn separately or via another apparatus. The audio apparatus can have a housing that contains the multiple audio components. The housing can be easily worn by a user, such as by coupling to a headset, ear mount/hook, user's clothing, or user's body. The audio components can be acoustically matched for redundancy and rapid swapping without requiring a separate audio setup. The audio components can be mounted astride or near one another in the audio apparatus. The audio components can also be separately wired so that each audio component can be independently activated. The housing can also be colored or camouflaged to match the user's skin or clothing.

One type of audio component is a microphone. One suitable microphone is referred to as a lavalier microphone. By having more than one acoustically matched microphone in a common, compact housing of the audio apparatus, the housing is easily worn and contains a redundant microphone that can be rapidly activated without have to engage in an audio setup (e.g., sound check, etc.). In addition, the microphones can be positioned in acoustically parallel positions within the housing to further provide acoustic equivalence. The housing can also include a separate aperture for audio output for each of the microphones within the housing.

Further, the housing can also be colored or camouflaged to match the user's skin or clothing.

The various aspects, features, embodiments or implementations of the invention described above can be used alone or in various combinations.

Embodiments of various aspects of the invention are discussed below with reference to FIGS. 1-11. However, those skilled in the art will readily appreciate that the detailed description given herein with respect to these figures is for explanatory purposes as the invention extends beyond these limited embodiments.

Figure 1:
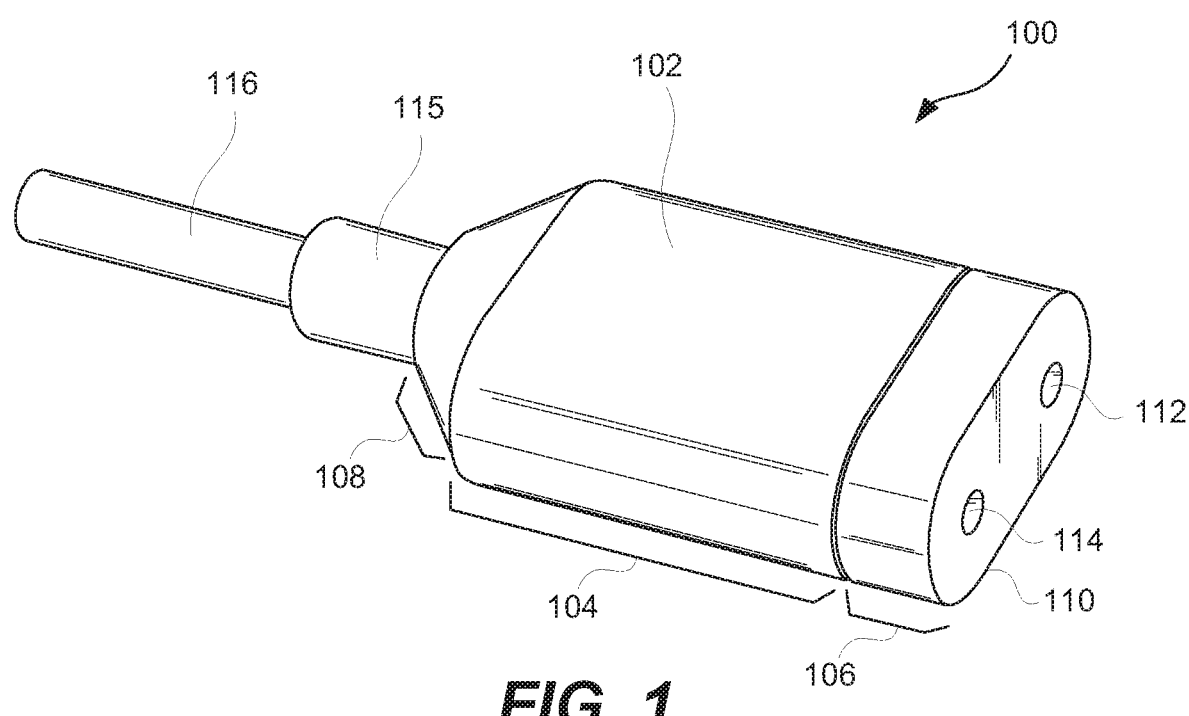
FIG. 1 is a perspective view of an audio apparatus according to one embodiment.

FIG. 1 is a perspective view of an audio apparatus 100 according to one embodiment. The audio apparatus 100 has a housing 102 with an internal cavity (as discussed in detail below) inside the housing 102. The internal cavity houses two or more audio components, namely, two or more microphones (not shown). The housing 102 can be considered as having a middle portion 104, a top portion 106 and a bottom portion 108. The middle portion 104 is configured to contain the two or more microphones in the internal cavity for audio pickup. The placement and use of the microphones within the internal hollow of the housing 102 are discussed in detail below. The top portion 106 includes a top piece (or cover) 110. The top piece 110 has apertures (or openings) 112 and 114 that extend through the top piece 110. Although FIG. 1 illustrates two apertures 112 and 114, in general, the top piece 110 can include an opening for each microphone contained within the housing 102. For example, if the internal cavity of the housing 102 housed four microphones, the top piece 110 may have four apertures. The bottom region 108 can be configured to receive a cable support structure 115. The cable support structure 115 is configured to receive and secure a cable 116 to the housing 102. The cable 116 can provide wires for electrical connection to the microphones. The cable support structure 115 can be secured to the housing 102 by mechanical interlock (e.g., complementary molded parts), adhesive, and any other know techniques. The cable 116 can be secured to the cable support structure 115 by adhesive, structural interference (e.g., friction), recess, detents, or any other known techniques.

As noted above, one type of audio component for use in the audio component 100 is a microphone for audio pickup. One suitable microphone is referred to as a lavalier microphone, which is a small electret or dynamic microphone, such as often use for theatre or and public speaking applications in order to allow for hands-free operation. Another type of audio component is an earphone. An earphone can, for example, also be or include an earbud.

Figure 2:
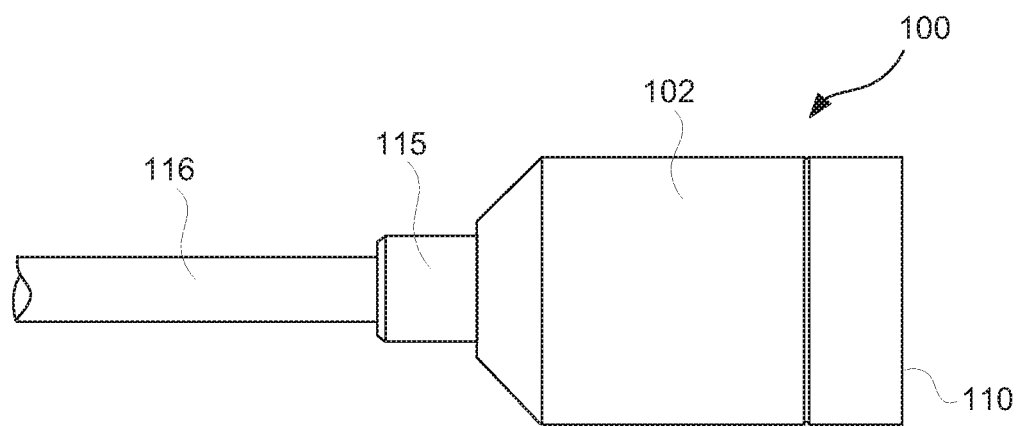
FIG. 2 is a top view of the audio apparatus shown in FIG. 1.
Figure 3:
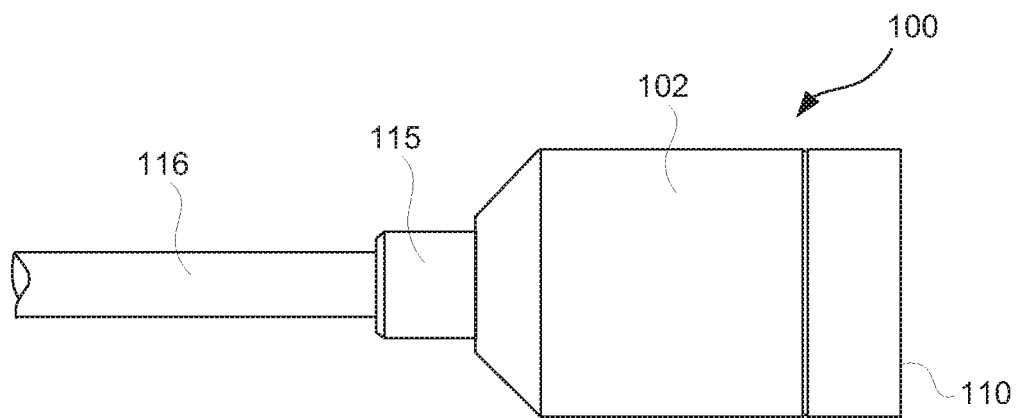
FIG. 3 is a bottom view of the audio apparatus shown in FIG. 1.
Figure 4:
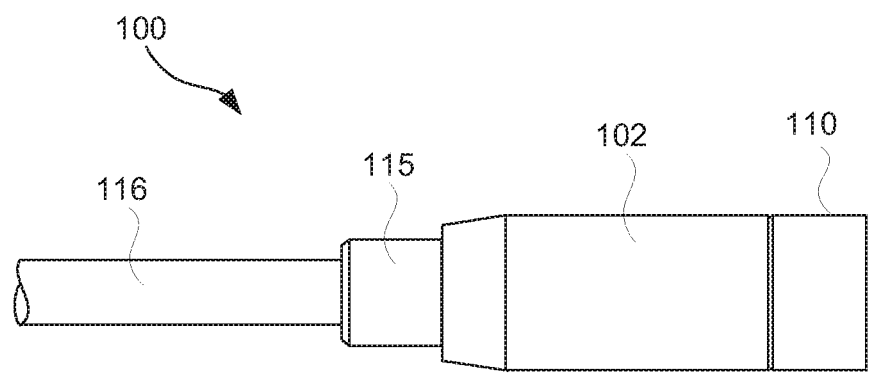
FIG. 4 is a left side view of the audio apparatus shown in FIG. 1.
Figure 5:
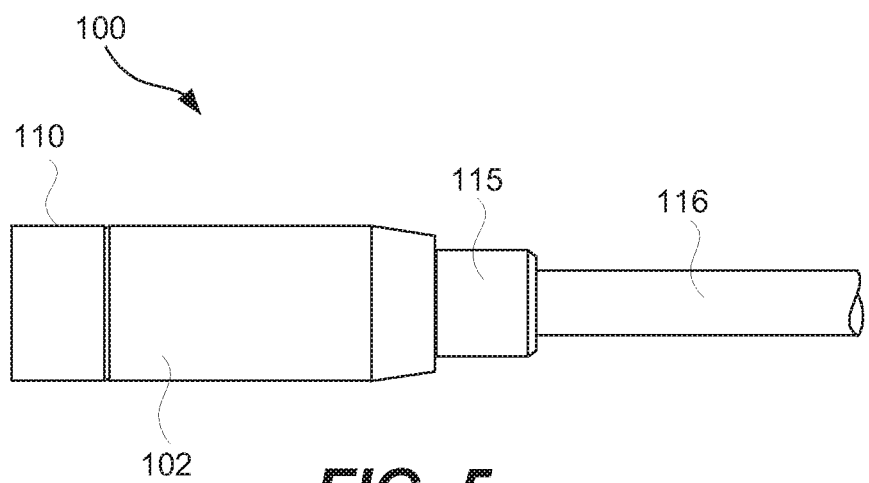
FIG. 5 is a right side view of the audio apparatus shown in FIG. 1.

FIG. 2 is a top view of the audio apparatus 100 shown in FIG. 1, and FIG. 3 is a bottom view of the audio apparatus 100 shown in FIG. 1. In addition, FIG. 4 is a left side view of the audio apparatus 100 shown in FIG. 1, and FIG. 5 is a right side view of the audio apparatus 100 shown in FIG. 1. As illustrated in FIGS. 2-4, the audio apparatus includes the housing 102 which receives the top piece 110 at one end and receives the cable 116 at the opposite end.

Figure 6:
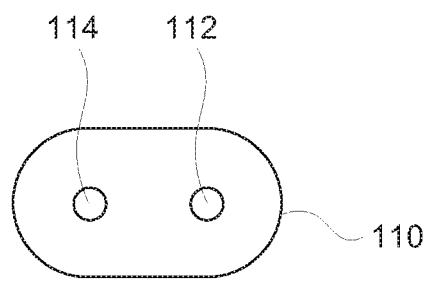
FIG. 6 is a front view of the audio apparatus shown in FIG. 1.

FIG. 6 is a front view of the audio apparatus 100 shown in FIG. 1. As illustrated, the top piece 110 for the housing 102 includes the apertures 112 and 114. The apertures 112 and 114 facilitates audio pickup by the microphones within the housing 102.

Figure 7:
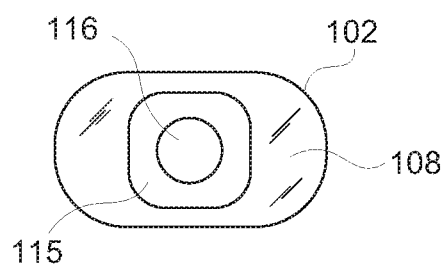
FIG. 7 is a back view of the audio apparatus shown in FIG. 1.

FIG. 7 is a back view of the audio apparatus 100 shown in FIG. 1. As illustrated, the bottom portion 108 of the housing 102 for the audio apparatus 100 is configured to receive the cable support structure 115, and the cable support structure is in turn configured to receive the cable 116 and to secure the cable 116 to the housing 102.

The particular configuration of the audio apparatus shown in FIGS. 1-7 is exemplary. Those skilled in the art will understand that the configuration and ornamental appearance of the audio apparatus can differ depending on implementation. As one example, the number of apertures for audio output can vary. As another example, the shape or configuration of the audio apparatus can vary. In one particular embodiment, the audio apparatus can by sized to about 13-14 mm in length, about 8-9 mm in width and 4-5 mm in height.

The audio apparatus can be formed by a molding process, such as injection molding. The housing and top for the audio apparatus can be formed on a variety of materials, including plastic, metal, ceramic, silicone, wood, and the like, or some combination thereof. In one implementation, the housing and top of the audio apparatus can be formed of a plastic material that can be molded into the desired configuration. For example, the plastic material can be made of Polyvinyl Chloride (PVC).

Figure 8A:
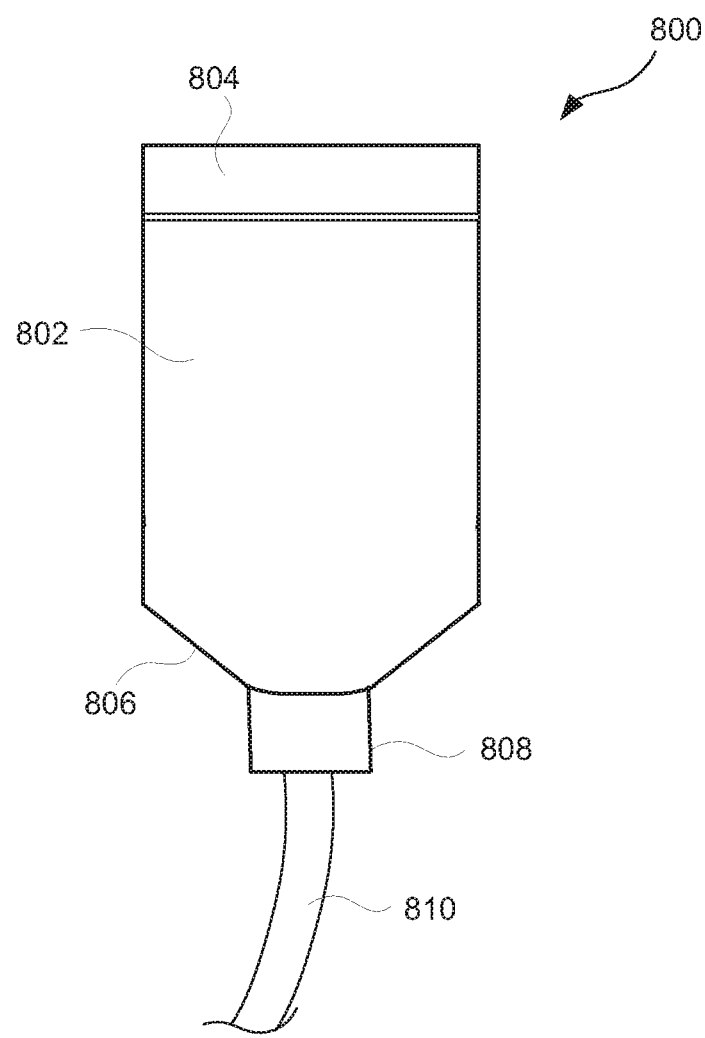
FIG. 8A is a top view of an audio apparatus according to one embodiment.

FIG. 8A is a top view of an audio apparatus 800 according to one embodiment. The audio apparatus 800 can be the same or substantially the same as the audio apparatus 100 illustrated in FIGS. 1-7. However, more generally, the audio apparatus 800 can support a pair of matched microphones. The audio apparatus 800 can, through independent wiring, utilize either of the microphones. In such an embodiment, one of the microphones can be considered an active microphone and the other can be considered a backup microphone.

More particularly, as illustrated in FIG. 8A, the audio apparatus 800 has a housing 802 that contains at least two microphones for the electronic device 800. The housing 802 has a cover 804 that is provided at a top portion of the housing 802. A bottom portion of the housing 802 has or receives a cable support structure 808. The cable support structure 808 couples to the bottom portion of the housing 802. The cable support structure 808 is configured to receive a cable 810 and can secure the cable 810 to the housing 802. The cable support structure 808 can be secured to the housing 802 by mechanical interlock (e.g., complementary molded parts), adhesive, and any other know techniques. The cable 810 can be secured to the cable support structure 810 by adhesive, structural interference (e.g., friction), recess, detents, or any other known techniques.

Figure 8B:
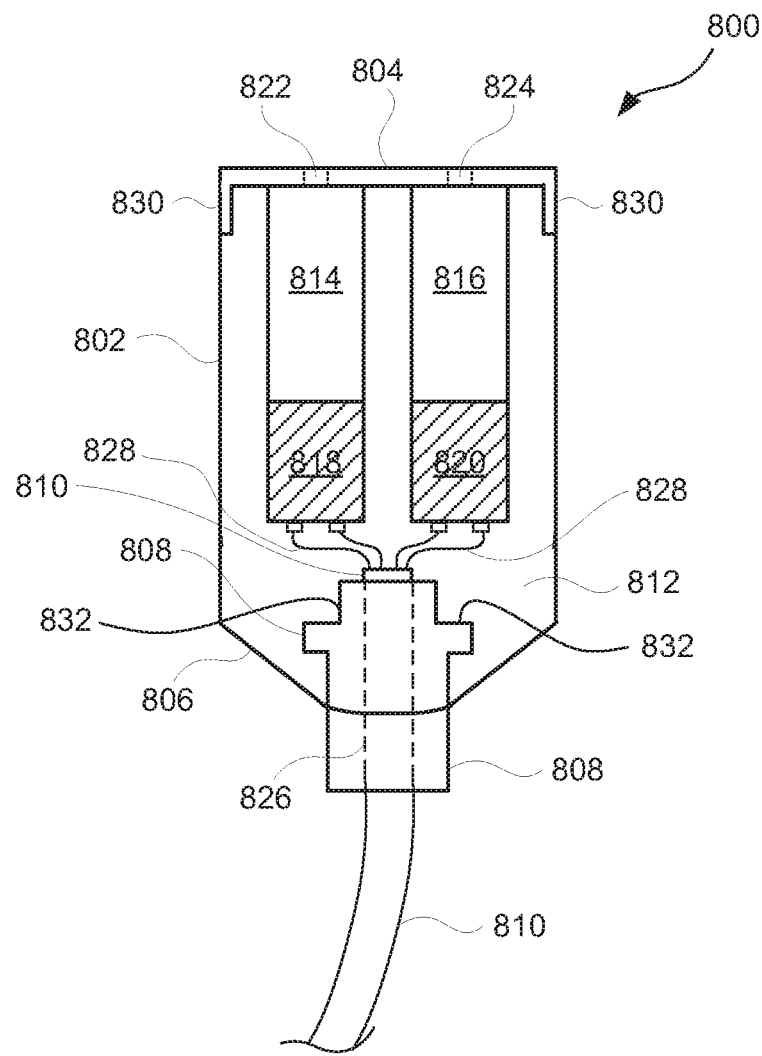
FIG. 8B is a top cross-sectional view of the audio apparatus illustrated in FIG. 8A according to one embodiment.

FIG. 8B is a top cross-sectional view of the audio apparatus 800 illustrated in FIG. 8A according to one embodiment. The housing 802 includes an internal cavity 812. The internal cavity 812 has first and second audio chambers 814 and 816. A first microphone 818 is positioned at a lower portion of the first audio chamber 814. The first microphone 818 is secured in position by any of a variety of means, such as via adhesive, recess, or any other known methods. A second microphone 820 is positioned at a lower portion of the second audio chamber 816. The second microphone 820 is secured in position by any of a variety of means, such as via adhesive, recess, or any other known methods.

The cover 804 includes a first opening (or aperture) 822 that is aligned with the first audio chamber 814. Audio output from the first microphone 818 travels through the first audio chamber 814 and exits through the first opening 822.

The cover 804 includes a second opening (or aperture) 824 that is aligned with the second audio chamber 816. Audio output from the second microphone 820 travels through the second audio chamber 816 and exits through the second opening 824.

The cable support structure 808 provided at the bottom portion of the housing 802 has an upper portion within the internal cavity 812, and has a lower portion external to the housing 802. An opening 826 extends though the cable support structure 808. The cable 810 extends through the opening 826 in the cable support structure 808. The cable 810 includes a plurality of wires 828. In one implementation, the cable 810 carries two wires 828 for the first microphone 818 and two wires 828 for the second microphone 820. As illustrated in FIG. 8B, the respective wires 828 are electrically connected to the corresponding microphone.

The cover 804 also includes an extended peripheral portion 830 provided at the periphery of the cover 804. The extended peripheral portion 830 extends over and couples against or mates with a top portion of the housing 802. In this embodiment, the cover 804 can be referred to as a cap.

It should be notes that the distance from a top surface of the first microphone 818 to the first opening (aperture) 822 in the extended peripheral portion 830 (or to the top of the cover 804) [more generally, to a acoustically reflective surface] is a distance d1, and wherein distance from a top surface of the second microphone 820 to the second opening (aperture) 824 in the extended peripheral portion 830 (or to the top of the cover 804) is a distance d2 [more generally, to a acoustically reflective surface], and wherein the distance d1 is the same (or at least substantially the same) as the distance d2. This ensures that both the first and second microphones 818, 820 have the same acoustic environment. Advantageously, the performance of the audio apparatus 800 is "matched" regardless of which of the first and second microphones 818, 820 is in use.

Alternatively, in another embodiment, the microphones 818 and 820 can be at least partially secured in position using the upper portion of cable support structure 808. In one implementation, although not shown in FIG. 8B, the upper portion can include a support structure 832 against which a bottom of the first microphone 818 and the second microphone 820 can rest or be secured. For example, this would result if the first and second microphones 818 and 820 are position lower in the internal cavity 812 of the housing 802 and the first and second audio chambers 814 and 816 are made deeper. This manner of securing the first and second microphones 818 and 820 likewise ensures that both the first and second microphones 818, 820 have the same acoustic environment.

Figure 9:
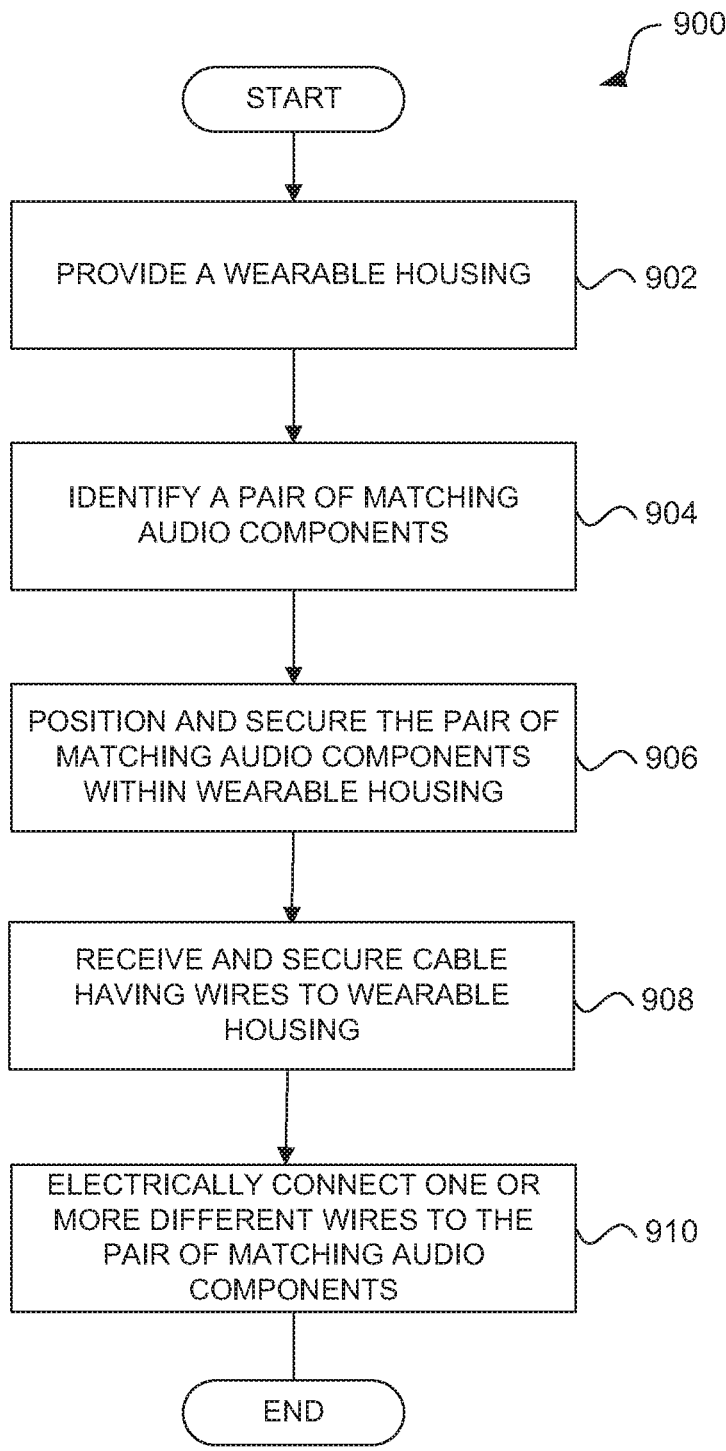
FIG. 9 is a flow diagram of a method for assembling an audio apparatus according to one embodiment.

FIG. 9 is a flow diagram of a method 900 for assembling an audio apparatus according to one embodiment. The audio apparatus can pertain to various of the audio apparatus discussed herein. The method 900 provides 902 a wearable housing for the audio apparatus. The wearable housing may be attached to a user's clothing or body as further discussed below. The audio apparatus includes a pair of audio components that have been acoustically matched. In one implementation, the audio components are microphones. The method 900 thus identifies 904 a pair of matching audio components (e.g., matched audio components). Next, the pair of matching audio components are positioned and secured 906 within the wearable housing. A cable having wires is also received and secured 908 to the wearable housing. Thereafter, the method electrically connects 910 one or more different wires to the pair of matching audio components.

Figure 10:
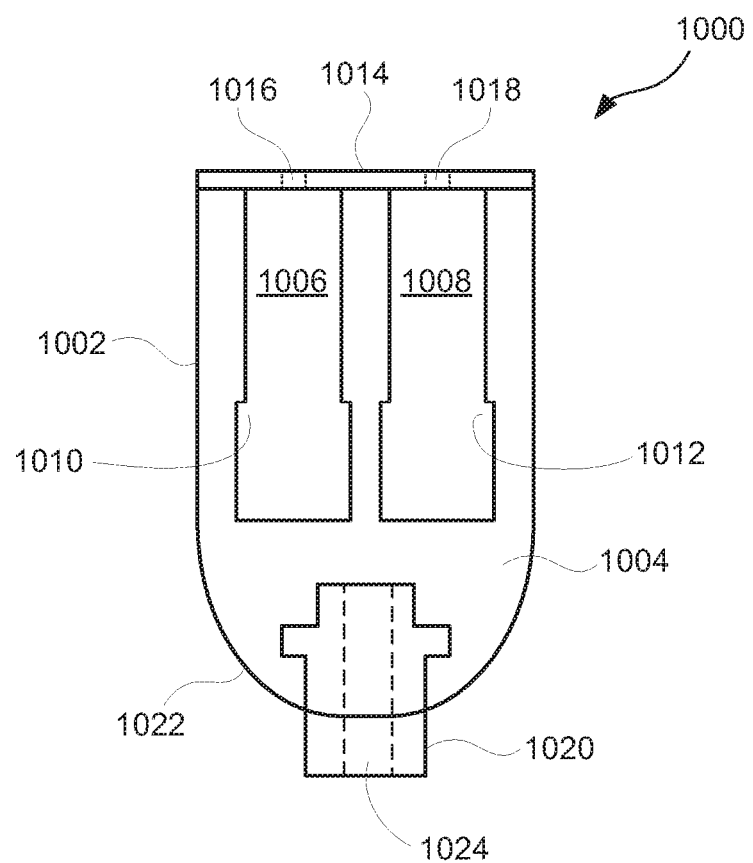
FIG. 10 is a top cross-sectional view of the audio apparatus illustrated according to another embodiment.

FIG. 10 is a top cross-sectional view of the audio apparatus 1000 according to another embodiment. The housing 1002 includes an internal cavity 1004. The internal cavity 1004 has first and second audio chambers 1006 and 1008. A lower portion of the first audio chamber 1006 can include a recess 1010 that is designed to receive a first microphone (not shown). A lower portion of the second audio chamber 1008 can include a recess 1012 that is designed to receive a second microphone (not shown).

The audio apparatus 1000 can have a top portion 1014, which can be an integral portion or a separate top structure. The top portion 1014 can include a first opening (or aperture) 1016 that is aligned with the first audio chamber 1006.

Audio output from the first microphone travels through the first audio chamber 1006 and exits through the first opening 1016. The top portion 1014 can include a second opening (or aperture) 1018 that is aligned with the second audio chamber 1008. Audio output from the second microphone travels through the second audio chamber 1008 and exits through the second opening 1018. The depth of the first and second audio chambers 1006, 1008 is the same (or substantially the same) so that the acoustic environment seen by first and second microphones are acoustically equivalent.

The audio apparatus 1000 can also include a cable support structure 1020 provided at a bottom portion 1022 of the housing 1002. The cable support structure 1020 can have an upper portion within the internal cavity 1004, and can have a lower portion external to the housing 1002. An opening 1024 can extend though the cable support structure 1020. A cable (not shown) can extend through the opening 1024 in the cable support structure 1020. As discussed above with reference to FIG. 8B, the cable can carry a plurality of wires for electrical coupling to the microphones that are to be retained in or adjacent the first and second audio chambers 1006, 1008 at least in part by the recesses 1010, 1012.

Figure 11:
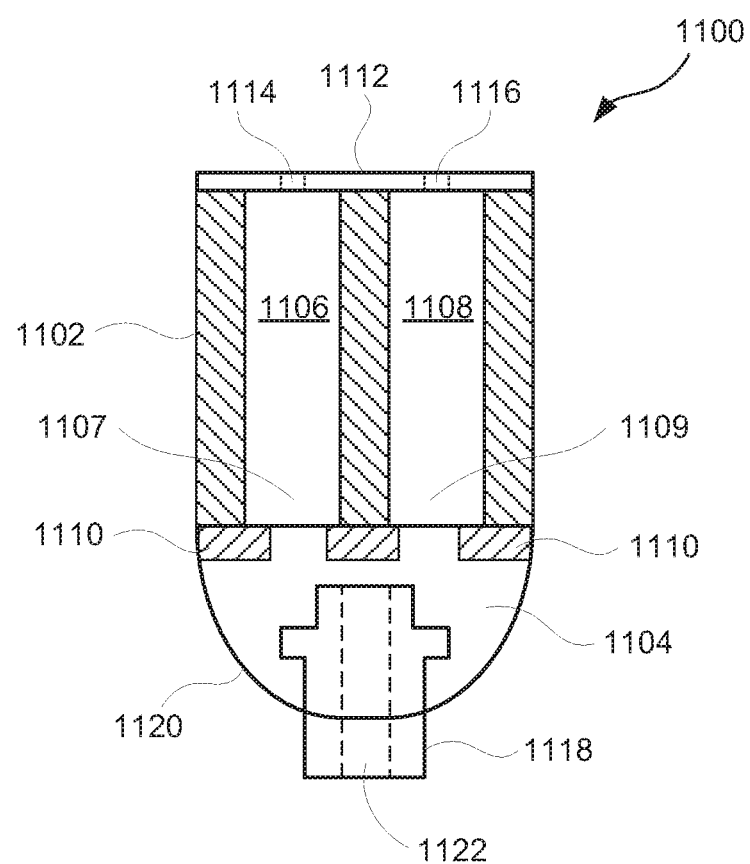
FIG. 11 is a top cross-sectional view of the audio apparatus according to still another embodiment.

FIG. 11 is a top cross-sectional view of the audio apparatus 1100 according to still another embodiment. The housing 1102 includes an internal cavity 1104. The internal cavity 1104 has first and second audio chambers 1106 and 1108. A lower portion 1107 of the first audio chamber 1106 can receive or couple to a first microphone (not shown). A lower portion 110 of the second audio chamber 1108 can receive or couple to a second microphone (not shown).

The audio apparatus 1100 can have a top portion 1112, which can be an integral portion or a separate top structure. The top portion 1112 can include a first opening (or aperture) 1114 that is aligned with the first audio chamber 1106. Audio output from the first microphone travels through the first audio chamber 1106 and exits through the first opening 1114. The top portion 1112 can include a second opening (or aperture) 1116 that is aligned with the second audio chamber 1108. Audio output from the second microphone travels through the second audio chamber 1108 and exits through the second opening 1116. In this embodiment, the internal cavity 1104 can include an internal support structure 1110. The internal support structure 1110 can be provided adjacent the bottom of the first and second audio chambers 1106, 1108 and can provide a support structure to which the first and second microphones can be secured.

The audio apparatus 1100 can also include a cable support structure 1118 provided at a bottom portion 1120 of the housing 1102. The cable support structure 1118 can have an upper portion within the internal cavity 1104, and can have a lower portion external to the housing 1102. An opening 1122 can extend though the cable support structure 1118. A cable (not shown) can extend through the opening 1122 in the cable support structure 1118. The cable can carry a plurality of wires for electrical coupling to the microphones that are received or retained in or adjacent the first and second audio chambers 1106, 1108, such as discussed above with reference to FIG. 8A. Although, as illustrated in FIG. 11, the internal support structure 1110 can be a separate component from the cable support structure 1118, in another embodiment the internal support structure 1110 can be part of the cable support structure 1118, or vice versa.

In one embodiment, the housing for audio component can be capable of being formed in a particular color and/or painted to have a particular color. It is sometimes advantageous to camouflage the presence of the ear mount being worn by a user. In such cases, it is often desirable to camouflage the ear mount by coloring the ear mount to best match the color of the user's skin or clothing.

In one embodiment, the only audio components within a housing of an audio apparatus are microphones. In such case, the audio apparatus is a dedicated apparatus for the microphones.

Audio apparatus according to embodiments of the invention can be assembled according to a method.

The audio apparatus can be attached to a user's clothing or body. The audio apparatus can be attached to or part of a headset or an ear mount. In one embodiment, an ear mount is configured to fit over an ear of a user. The ear mount can include one or more wire grooves to secure wires and/or the one or more audio components. The ear mount can be malleable so its shape can be customized for a given user. The ear mount can also be length alterable for customization of its size as well as placement of audio components. The ear mount can also facilitate rapid setup and/or alteration for individual users whereby different audio components and/or their placement can be customized. The ear mount can also be colored or camouflaged to match the user's skin or clothing. The ear mount can also be referred to as an ear mounting device. Additional details on ear mounts are contained in U.S. Pat. No. 9,706,285, which is incorporated herein by reference for all purposes.

An audio apparatus is also described and illustrated in U.S. Design Application No. 29/621,415, filed Oct. 7, 2017, and entitled WEARABLE MICROPHONE, which is incorporated herein by reference for all purposes.

The various aspects, features, embodiments or implementations of the invention described above can be used alone or in various combinations.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A wearable audio apparatus, comprising:
a housing having an internal cavity;

a first microphone positioned and secured within the internal cavity, the first microphone having a first audio responsiveness;

a second microphone positioned and secured within the internal cavity, the second microphone having a second audio responsiveness; and a cover provided on a top portion of the housing, the cover having first and second apertures therein, the first aperture being aligned over the first microphone and the second aperture being aligned over the second microphone, wherein the second microphone serves as a back-up microphone to the first microphone, and wherein only one of the first microphone and the second microphone is actively used at a given time.

2. A wearable audio apparatus as recited in claim 1, wherein distance from a top surface of the first microphone to the first aperture in the cover is a distance d1, and wherein distance from a top surface of the second microphone to the second aperture in the cover is a distance d2, and wherein the distance d1 is substantially the same as the distance d2.

3. A wearable audio apparatus as recited in claim 1, wherein distance from a top surface of the first microphone to the first aperture in the cover is a distance d1, and wherein distance from a top surface of the second microphone to the second aperture in the cover is a distance d2, and wherein the distance d1 is the same as the distance d2.

4. A wearable audio apparatus as recited in claim 1, wherein the internal cavity includes a first feature configured to receive at least a portion of the first microphone, and a second feature configured to receive at least a portion of the second microphone.

5. A wearable audio apparatus as recited in claim 4, wherein the first feature comprises a first recess, and the second feature comprises a second recess.

6. A wearable audio apparatus as recited in claim 5, wherein the first recess is configured to receive at least a portion of the first microphone, and wherein the second recess is configured to receive at least a portion of the second microphone.

7. A wearable audio apparatus as recited in claim 1, wherein the wearable audio apparatus comprises:

an internal support structure provided internal to the housing to support and secure the first and second microphones within the housing.

8. A wearable audio apparatus as recited in claim 1, wherein the first audio responsiveness and the second audio responsiveness are matched to within 10%.

9. A wearable audio apparatus as recited in claim 1, wherein the first audio responsiveness and the second audio responsiveness are matched to within 5%.

10. A wearable audio apparatus as recited in claim 1, wherein the wearable audio apparatus comprises:

a single cable having a plurality of wires.

11. A wearable audio apparatus as recited in claim 10, wherein the plurality of wires in the cable includes first, second, third and fourth wires, wherein the first and second wires are electrically connected to the first microphone, and wherein the third and fourth wires are electrically connected to the second microphone.

12. A wearable audio apparatus as recited in claim 10, wherein the wires in the cable are used to independently wire the first and second microphones.

13. A wearable audio apparatus as recited in claim 1, wherein the wearable audio apparatus is a dual microphone lavaliere.

14. A wearable audio apparatus as recited in claim 1, wherein the wearable audio apparatus includes no other audio components other than microphones.

15. An audio apparatus, comprising:

a cable having a plurality of wires;

a housing having a top region, a middle region and a bottom region, the top region having an opening, the middle region having an internal cavity, the bottom region having an opening for receiving the cable;

a first microphone positioned and secured within the internal cavity, the first microphone having a first audio responsiveness;

a second microphone positioned and secured within the internal cavity, the second microphone having a second audio responsiveness;

an internal support structure provided internal to the housing at the bottom region, the internal support structure being configured to at least secure the cable to the bottom region and/or middle region of the housing; and a cover provided on a top portion of the housing, the cover having first and second apertures therein, the first aperture being over the first microphone and the second aperture being over the second microphone, wherein the second microphone serves as a back-up microphone to the first microphone, and wherein only one of the first microphone and the second microphone is actively used at a given time.

16. An audio apparatus as recited in claim 15, wherein distance from a top surface of the first microphone to the first aperture in the cover is a distance d1, and wherein distance from a top surface of the second microphone to the second aperture in the cover is a distance d2, and wherein the distance d1 is substantially same as the distance d2.

17. An audio apparatus as recited in claim 15, wherein the internal cavity includes a first feature configured to receive at least a portion of the first microphone, and a second feature configured to receive at least a portion of the second microphone.

18. An audio apparatus as recited in claim 17, wherein the first feature comprises a first recess, and the second feature comprises a second recess.

19. An audio apparatus as recited in claim 17, wherein the first recess is configured to receive at least a portion of the first microphone, and wherein the second recess is configured to receive at least a portion of the second microphone.

20. An audio apparatus as recited in claim 15, wherein the internal cavity includes a plurality of distinct audio chambers, including a first audio chamber and a second audio chamber.

21. An audio apparatus as recited in claim 20, wherein a top portion of the first audio chamber is adjacent the first aperture of the cover, and a bottom portion of the first audio chamber includes or is adjacent to the first microphone, and wherein a top portion of the second audio chamber is adjacent the second aperture of the cover, and a bottom portion of the second audio chamber includes or is adjacent to the second microphone.

22. An audio apparatus as recited in claim 20, wherein a top portion of the first audio chamber is adjacent the first aperture of the cover, and a bottom portion of the first audio chamber includes or couples to a first feature, and wherein a top portion of the second audio chamber is adjacent the second aperture of the cover, and a bottom portion of the second audio chamber includes or couples to a second feature.

23. An audio apparatus as recited in claim 22, wherein the first feature is configured to receive at least a portion of the first microphone, and the second feature configured to receive at least a portion of the second microphone.

24. An audio apparatus as recited in claim 20,
wherein a top portion of the first audio chamber is adjacent the first aperture of the cover, and a bottom portion of the first audio chamber includes a first recess, and
wherein a top portion of the second audio chamber is adjacent the second aperture of the cover, and a bottom portion of the second audio chamber includes a second recess.

25. An audio apparatus as recited in claim 24, wherein the first recess is configured to receive the first microphone, and the second recess is configured to receive the second microphone.

26. An audio apparatus as recited in claim 15, wherein the cable is a single cable, and wherein the audio apparatus receives only the single cable.

27. An audio apparatus as recited in claim 15,
wherein the plurality of wires in the cable includes first, second, third and fourth wires,
wherein the first and second wires are electrically connected to the first microphone, and
wherein the third and fourth wires are electrically connected to the second microphone.

28. An audio apparatus as recited in claim 15,
wherein the plurality of wires in the cable includes a ground wire and first, second, third and fourth wires,
wherein the ground wire is electrically connected to at least one of the first microphone and the second microphone,
wherein the first and second wires are electrically connected to the first microphone, and
wherein the third and fourth wires are electrically connected to the second microphone.

29. An audio apparatus as recited in claim 15, wherein the internal support structure further provides the wires to the internal cavity, wherein at least one of the wires is connected to the first microphone is secured in place in the internal cavity, and wherein at least another one of the wires is connected to the second microphone.

30. An audio apparatus as recited in claim 15, wherein the audio apparatus is a lavaliere microphone apparatus.

\* \* \* \* \*